US012445432B2

(12) United States Patent
Elul et al.

(10) Patent No.: US 12,445,432 B2
(45) Date of Patent: Oct. 14, 2025

(54) SYSTEM AND METHOD FOR PROVIDING A WEB BASED RDP SERVICE THROUGH A ZERO TRUST CLOUD ENVIRONMENT

(71) Applicant: HEWLETT PACKARD ENTERPRISE DEVELOPMENT LP, Spring, TX (US)

(72) Inventors: Natan Elul, Tel Aviv (IL); Shachar Dekel, Tel Aviv (IL); Gil Azrielant, Tel Aviv (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 191 days.

(21) Appl. No.: 18/359,517

(22) Filed: Jul. 26, 2023

(65) Prior Publication Data
US 2024/0031358 A1   Jan. 25, 2024

Related U.S. Application Data

(63) Continuation-in-part of application No. 17/654,309, filed on Mar. 10, 2022.

(51) Int. Cl.
*H04L 9/40* (2022.01)
*G06F 9/451* (2018.01)

(52) U.S. Cl.
CPC ............ *H04L 63/083* (2013.01); *G06F 9/452* (2018.02)

(58) Field of Classification Search
CPC ...... H04L 63/083; H04L 63/168; G04F 9/452
See application file for complete search history.

(56) References Cited

U.S. PATENT DOCUMENTS

| | | | |
|---|---|---|---|
| 9,148,405 B2 | 9/2015 | Narendra et al. | |
| 11,240,242 B1 | 2/2022 | Celik | |
| 11,444,925 B1 | 9/2022 | Patimer et al. | |
| 11,470,100 B1 | 10/2022 | Christian | |
| 11,716,312 B1 | 8/2023 | McNamara, Jr. | |
| 12,184,696 B2 | 12/2024 | Subbanna et al. | |
| 2010/0146611 A1 | 6/2010 | Kuzin et al. | |
| 2015/0382195 A1 | 12/2015 | Grim et al. | |
| 2017/0331832 A1 | 11/2017 | Lander et al. | |
| 2018/0295137 A1 | 10/2018 | Zager et al. | |
| 2019/0068578 A1 | 2/2019 | Balakrishnan et al. | |
| 2019/0081942 A1 | 3/2019 | Suresh | |
| 2019/0141015 A1 | 5/2019 | Nellen | |
| 2020/0236112 A1 | 7/2020 | Pularikkal et al. | |
| 2020/0336466 A1 | 10/2020 | Goldschlag et al. | |
| 2021/0092200 A1 | 3/2021 | Chauhan et al. | |
| 2021/0136041 A1* | 5/2021 | Foxhoven | H04L 9/3263 |

(Continued)

OTHER PUBLICATIONS

International Search Report for PCT Application PCT/IB2023/052327 dated Jun. 13, 2023. The International Bureau of WIPO.

(Continued)

*Primary Examiner* — Kristie D Shingles
(74) *Attorney, Agent, or Firm* — Trop, Pruner & Hu, P.C.

(57) ABSTRACT

Remote desktop protocol (RDP) is a proprietary protocol for controlling machines over a network. In order to overcome certain deficiencies of the protocol a method is disclosed utilized in a zero trust cloud environment, to provide access to a pool of RDP servers, via an RDP client or via a web based interface while simultaneously providing an authenticated and secure policy based experience.

20 Claims, 5 Drawing Sheets

(56) References Cited

U.S. PATENT DOCUMENTS

| | | | |
|---|---|---|---|
| 2021/0250333 A1 | 8/2021 | Negrea et al. | |
| 2022/0075889 A1 | 3/2022 | Friedman | |
| 2022/0353244 A1* | 11/2022 | Kahn | H04L 67/12 |
| 2023/0123781 A1* | 4/2023 | Kaimal | H04L 41/0893 |
| | | | 726/12 |
| 2023/0164183 A1 | 5/2023 | Kothari et al. | |
| 2023/0224167 A1 | 7/2023 | Wang et al. | |
| 2023/0291726 A1 | 9/2023 | Dekel et al. | |
| 2023/0370495 A1 | 11/2023 | Desai et al. | |
| 2023/0412638 A1 | 12/2023 | Dogaru et al. | |
| 2024/0121211 A1* | 4/2024 | Bhatia | H04L 63/0272 |
| 2024/0129338 A1 | 4/2024 | Azad et al. | |

OTHER PUBLICATIONS

Written Opinion of the International Searching Authority for PCT Application PCT/IB2023/052327 dated Jun. 13, 2023. The International Bureau of WIPO.

* cited by examiner # SYSTEM AND METHOD FOR PROVIDING A WEB BASED RDP SERVICE THROUGH A ZERO TRUST CLOUD ENVIRONMENT

CROSS-REFERENCE TO RELATED APPLICATIONS

This application is a continuation-in-part of U.S. Non-Provisional patent application Ser. No. 17/654,309 filed on Mar. 10, 2022, the contents of which are hereby incorporated by reference.

TECHNICAL FIELD

The disclosure generally relates to remote desktop access, and particularly improved techniques for providing remote desktop access.

BACKGROUND

Remote desktop protocol (RDP) is a communication protocol for controlling another machine over a network connection. A client running client software (or in some instances web interface) connects to a server running server software, which allows the client to control the server. RDP is a proprietary protocol developed by Microsoft® and is widely in use in network and cloud environments.

As is often with proprietary protocols, customizing the protocol for a user's needs is not often straightforward. Further, certain functionalities may be totally absent, leaving a user to either find a workaround, look for an alternative solution, or simply wait until such time as the owner of the proprietary protocol decides to produce a new version.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving a request from a client device to connect to a zero trust cloud environment, the request including an user account identifier. Method may also include verifying an identity of the user account. Method may furthermore include generating a web based graphical user interface (GUI), the GUI including a target server selection. Method may in addition include generating a web based GUI to capture login credentials, where the client device is configured to render the GUI a web client of the client device. Method may moreover include authenticating the captured login credentials with the target server deployed in a secure network environment. Method may also include initiating a hypertext transfer protocol (HTTP) session between the client device and a clientless gateway, where the clientless gateway is configured to transfer RDP over HTTP. Other embodiments of this aspect include corresponding computer systems, apparatus, and computer programs recorded on one or more computer storage devices, each configured to perform the actions of the methods.

Implementations may include one or more of the following features. Method may include: configuring the clientless gateway to initiate an RDP session with a frontend RDP server of the zero trust cloud environment; and, configuring the clientless gateway to provide RDP data to the frontend RDP server. Method may include: configuring the frontend RDP server to direct data received from the client device via the clientless gateway to the target server, in response to successfully authenticating the captured login credentials. Method may include: receiving a data packet from the client device; translating the data packet to an RDP instruction; and configuring the clientless gateway to send the RDP instruction to the target server. Method may include: configuring the clientless gateway to terminate the RDP session. Method may include: terminating the RDP session in response to determining that a predetermined amount of time has lapsed. Method where the clientless gateway is configured to transfer RDP over HTTP. Method where the zero trust cloud environment includes any one of: an access portal server, the clientless gateway, a backend server, and any combination thereof. Method where the backend server is configured to connect to a connector deployed in the secure network environment. Implementations of the described techniques may include hardware, a method or process, or a computer tangible medium.

In one general aspect, non-transitory computer-readable medium may include one or more instructions that, when executed by one or more processors of a device, cause the device to: receive a request from a client device to connect to a zero trust cloud environment, the request including an user account identifier. Medium may furthermore verify an identity of the user account. Medium may in addition generate a web based graphical user interface (GUI), the GUI including a target server selection. Medium may moreover generate a web based GUI to capture login credentials, where the client device is configured to render the GUI a web client of the client device. Medium may also authenticate the captured login credentials with the target server deployed in a secure network environment. Medium may furthermore initiate a hypertext transfer protocol (HTTP) session between the client device and a clientless gateway, where the clientless gateway is configured to transfer RDP over HTTP. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: receive a request from a client device to connect to a zero trust cloud environment, the request including an user account identifier. System may in addition verify an identity of the user account. System may moreover generate a web based graphical user interface (GUI), the GUI including a target server selection. System may also generate a web based GUI to capture login credentials, where the client device is configured to render the GUI a web client of the client device. System may furthermore authenticate the captured login credentials with the target server deployed in a secure network environment. System may in addition initiate a hypertext transfer protocol (HTTP) session between the client device and a clientless gateway, where the clientless gateway is configured to transfer RDP over HTTP. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: configure the clientless gateway to initiate an RDP session with a frontend RDP server of the zero trust cloud environment; and configure the clientless gateway to provide RDP data to the frontend RDP server. System where the memory contains further instructions which when executed by the processing circuitry further configure the system to: configure the frontend RDP server to direct data received from the client device via the clientless gateway to the target server, in response to successfully authenticating the captured login credentials. System where the memory contains further instructions which when executed by the processing circuitry further configure the system to: receive a data packet from the client device; translate the data packet to an RDP instruction; and configure the clientless gateway to send the RDP instruction to the target server. System where the memory contains further instructions which when executed by the processing circuitry further configure the system to: configure the clientless gateway to terminate the RDP session. System where the memory contains further instructions which when executed by the processing circuitry further configure the system to: terminate the RDP session in response to determining that a predetermined amount of time has lapsed. System where the clientless gateway is configured to transfer RDP over HTTP. System where the zero trust cloud environment includes any one of: an access portal server, the clientless gateway, a backend server, and any combination thereof. System where the backend server is configured to connect to a connector deployed in the secure network environment. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
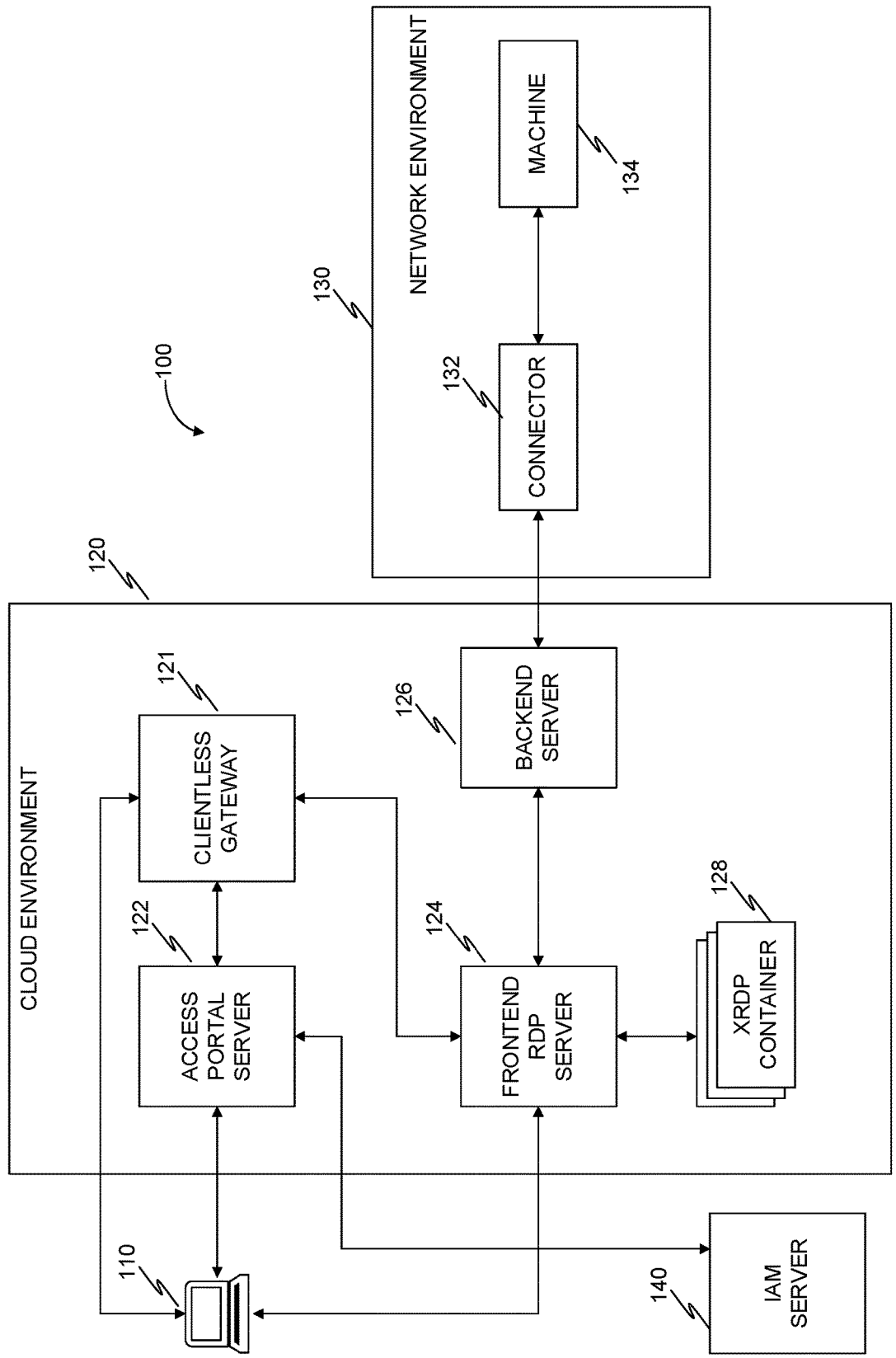
FIG. 1 is a network diagram of a zero trust network architecture for providing an RDP service, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing a web-based remote desktop protocol (RDP) session through a zero trust network. In certain embodiments it is advantageous to initiate an RDP session between a client device and a remote server, the remote server deployed in a secure network environment, over HTTP, i.e., using a web browser.

In such embodiments, an intermediary cloud environment (e.g., a zero trust network) is configured to log in a user account through a graphic user interface (GUI) of the zero trust network, and initiate a connection to a remote server. In an embodiment, the GUI is generated by an access portal server, deployed in the zero trust network.

For example, in an embodiment, the access portal server is configured to provide the client device with a GUI through the web browser, for example as a webpage, in which a login credentials are captured. In certain embodiments, the zero trust network is configured to authenticate the login credentials, initiate an RDP session, and present the same in a browser application of the client device.

According to an embodiment, Apache® Guacamole® is utilized to transfer RDP over HTTP, also known as translating between RDP and HTTP protocols. In an embodiment, this is advantageous to implement where a user device does not have an RDP client installed, or when a client device (e.g., a mobile smartphone) does not support deployment thereon of an RDP client application, and is used to log in to a resource in a secure environment.

FIG. 1 is a network diagram 100 of a zero trust network architecture for providing an RDP service, implemented in accordance with an embodiment. A client device 110 is operative for communicating over a network (not shown) with an access portal server 122, and a frontend RDP server 124, implemented in a first cloud environment 120. A client device 110 may be a personal computer, smart phone, tablet, and the like. The client 110 may run an RDP client, or in another embodiment may access RDP services through a web browser (e.g. utilizing an IIS server). The first cloud environment is a computing environment for providing services utilizing a zero trust architecture. The first cloud environment may be implemented on one or more cloud infrastructure technologies, such as Microsoft® Azure, Google® Cloud Platform (GCP), Amazon® Web Services (AWS) and the like.

Establishing a connection between the client device 110 and the frontend RDP server 124 may be performed by an RDP client, or by web based access. An RDP client based connection requires an RDP client application to be installed on the client device 110. For example, the client device 110 may request a connection with the access portal 122. The access portal 122 requests identifying credentials from the client device. In an embodiment the client device 110 may utilize an identity access management (IAM) service, for example from IAM server 140, in order to verify the user account which is requesting access via the client device 110. In an embodiment the IAM server 140 may be implemented in the first cloud environment 120. The client device 110 may provide the access portal server 122 with login credentials, such as username and password.

After verifying the identity of the user account, the access portal server 122 may provide the client device 110 with an RDP file (.rdp) which includes therein an address or server name to connect to, a port, token, token version, token type, and the like. A token may be a unique ID which is associated with a user account, tenant, or combination thereof. In certain embodiments a token expiry time may be specified. A token type may be a file token, or session token. In certain embodiments the token version may indicate an expiry time. In other embodiments the token is stored, for example in a storage of the frontend RDP server 124, together with a date. The frontend server may determine that a token is expired based on the date, or timestamp.

For example, the frontend RDP server 124 may include a policy which defines tokens as expired after a predetermined period of time has lapsed. In some embodiments the predetermined period of time may be relative to a last time in which the user account was verified. In an embodiment, a policy may be used to define if a session is inactive for a predetermined period of time then the last time a user account was verified may be longer than that period of time, and therefore considered no longer valid. When a token is found to be expired, the frontend RDP server 124 may deny the connection, or, in other embodiments, direct the session to a designated XRDP container, such as container 128. The XRDP container may be used to reauthenticate (or authenticate, if authentication failed for other reasons) the user credentials, and then the frontend RDP server may initiate a reconnect in response to determining that the user credentials have been authenticated.

The RDP file may be generated based on one or more policies which can be stored in a storage (not shown) of the frontend RDP server 124. In other embodiments the policy may be stored on a policy server, implemented as a virtual workload or physical workload in the cloud environment 120. The RDP file may configure the client device 110 to initiate an RDP session with a frontend server 124.

A web based connection between the frontend RDP server 124 and the client device 110 may initiate with the access portal server 122. The access portal server 122 provides the client device 110 with a GUI from which a user of the client device 110 can select a machine or application in a secure network environment 130 to which they wish to connect. The access portal server 122 may then request login credentials for the selected RDP application. In certain embodiments, the GUI may include a selection for applications which to which the user wishes to connect. This may be useful in instances where the user is interested in accessing a certain application on a secure network environment 130, rather than a specific machine on the secure network, wherein the application may run on each of a plurality of machines.

In a web based connection, discussed in more detail in FIG. 3 below, the client device 110 may select a machine from the GUI provided by the access portal server 122, such as machine 134 of the secure network environment 130. Upon selecting the RDP application in the web based GUI and providing valid login credentials the access portal server 122 registers an RDP session setting in a clientless gateway 121, and then directs the client device 110 to communicate with the clientless gateway 121. The clientless gateway 121 is used to translate the RDP protocol to display over HTTP, thus making it accessible in a web browser client of the client device 110. The clientless gateway 121 initiates an RDP connection with the frontend RDP server 124, which initializes an RDP session with a target server.

Upon connecting the client device 110 to a frontend RDP server 124 utilizing the client RDP application, the frontend RDP server 124 may determine if user credentials are further required. If yes, the frontend RDP server 124 designates a connection to another machine in order to capture login credentials for the designated machine. For example, the frontend server 124 may initiate a container 128 running a Linux OS with an XRDP application. In an embodiment, the frontend server 124 may instruct a serverless function to spin up an XRDP container for each login instance of a user.

The XRDP container 124 provides an isolated environment for each user, in which login credentials of the user may be captured. The login credentials may include a username and password of the machine which the user wishes to connect to, username and password for a domain, authentication token, etc. The XRDP container 124 may be used for other interactions with the client device 110, and may be used to improve user experience by providing and requesting additional information, rendering information pages, and the like.

In an embodiment, the XRDP container 124 may provide a user with a browser client and directed to a web page rendered by the access portal server 122 which provides a form in which to enter the login credentials. The access portal server 122 may provide the login credentials to the frontend server 124 which may use the login credentials to determine if the user is authorized to log in to the machine, which is the target RDP server (i.e. the machine to which the client wishes to connect to). In an embodiment the login credentials may be operating system (e.g. Microsoft Windows®) credentials, which may be different than credentials used for authentication with the zero trust cloud environment 120. In certain embodiments, the zero trust cloud environment 120 may store login credentials, which the zero trust cloud environment 120 may encrypt, in order to use the login credentials for future sessions, thus reducing the need for capturing login details, for example by using the XRDP container. The login credentials may be stored for example by the frontend RDP server 124 in a storage device (not shown).

In some embodiments, a static set of credentials (e.g. username, password, domain, or combination thereof) is stored in the zero trust cloud environment, utilized for any user that has access (for example based on a policy) to a configured RDP application. The user selects the RDP application from the access portal server GUI, then a client device thereof executes the .rdp file. The frontend RDP server 124 uses the static set of credentials without revealing them to the user, and connects the user to the target server. This is advantageous for example to allow third parties access a specific RDP resource within the secure network without generating, or revealing, a dedicated windows user which is configured in the secure network active directory.

For example, a backend server 126 may communicate with a connector 132, which is implemented in the secure network environment 130 of the machine 134. The secure network environment 130 may be a secure network into which it is desired to provide controlled access to certain machines. The connector 132 communicates with a machine 134, which a user device is attempting to access. In an embodiment, a plurality of connectors, each deployed in a secure network environment, each communicate with one of a plurality of backend servers.

In response to determining that the login credentials allow the user device 110 to connect to the machine 134, the frontend server 124 injects a reconnect packet to the communication session between the user device 110 and the XRDP container 128. The reconnect packet configures the user device 110 to end the current RDP session between the client device and the XRDP container, and reconnect with a new session token to the frontend server 124. The frontend server 124 uses the login credentials provided by the client device 110 to the XRDP container 128 in order to access the machine 134.

The communication path between the user device 110 and machine 134 includes the frontend server 124, the backend server 126, and connector 132. In an embodiment a first token (authentication token) may be used for authenticating the client with the frontend RDP server 124 via the access portal server 122, and a second token (session token) may be used for connecting the client device 110 to the frontend RDP server 124 when providing a connection to the target RDP server (i.e. machine 134).

RDP is generally a protocol which does not support an entity in the middle of communication. However, by utilizing the zero trust cloud architecture described herein the client device is able to access a resource, in this case machine 134 in the secure network environment 130, while the connection is monitored, authenticated and verified by the first cloud environment 120. Such capabilities are not native to RDP and may be advantageous to have. Moreover, various forms of functionality can be implemented on top of this architecture to provide additional benefits for such a controlled access environment.

Figure 2:
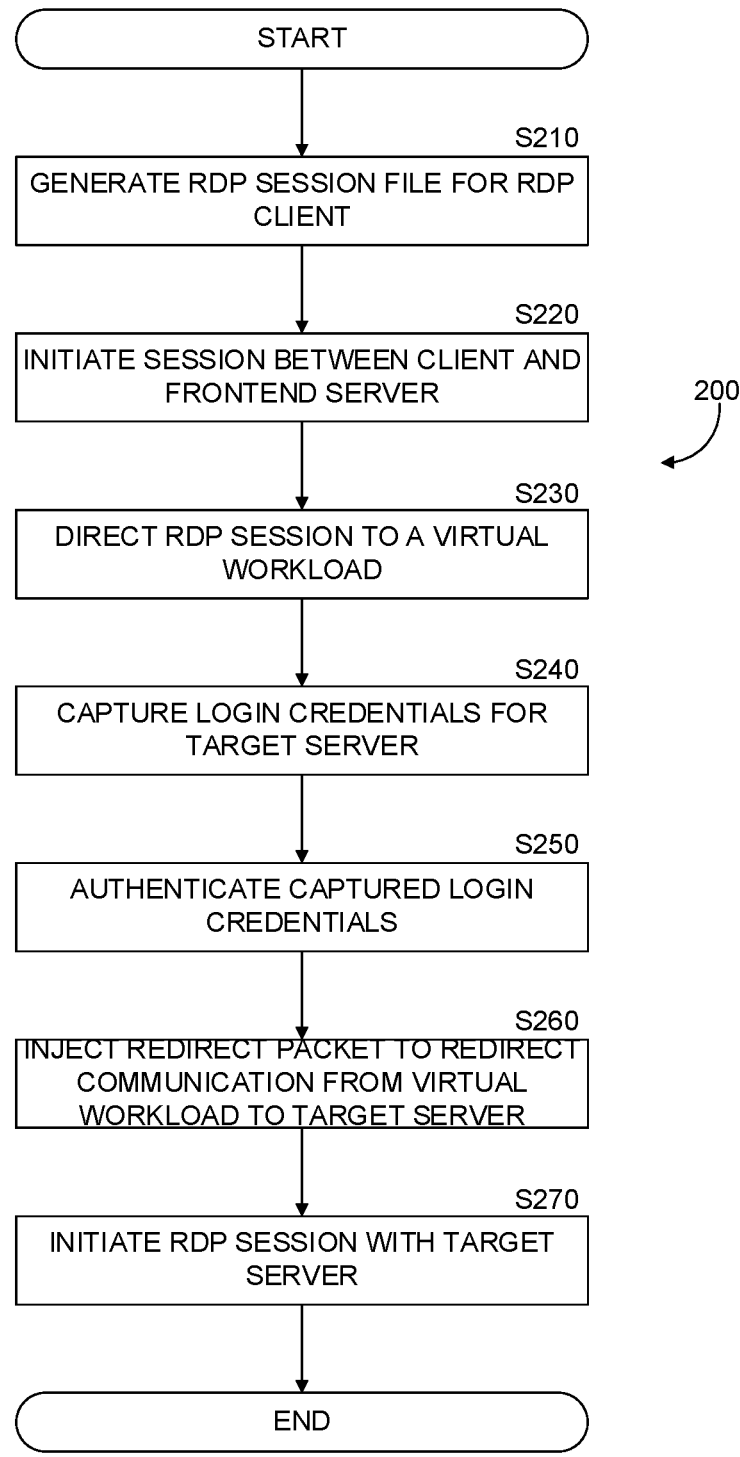
FIG. 2 is a flowchart a method for an RDP client based connection between a client device and a server utilizing RDP in a zero trust environment, implemented in accordance with an embodiment.

FIG. 2 is a flowchart 200 of a method for an RDP client based connection between a client device and a server utilizing RDP through a zero trust environment, implemented in accordance with an embodiment.

At S210, an RDP session file is generated for a client. The RDP session file may be a textual file which includes information which can be extracted by the client device, having an RDP client. The extracted information allows the RDP client to initiate an RDP session with an RDP frontend server. The extracted information may be, for example, a server name, server address, network path, port, token, token version, token type, expiry, etc.

In an embodiment the RDP session file is generated based on a request initiated by the client device to connect to a remote machine (i.e. target server) in a secure network environment through an intermediary cloud environment (such as cloud environment 120).

At S220, a zero trust RDP session is initiated between the RDP client and an RDP frontend server, utilizing the RDP session file. The RDP session file may designate a target machine. In an embodiment the RDP client may render a user interface on the client device to capture login details of the target machine.

At S230, a virtual workload is spun up, to which the zero trust RDP session is directed. In an embodiment, the virtual workload is implemented as a container, for example utilizing XRDP. Directing the zero trust RDP session to an XRDP container may include generating an instruction for the frontend RDP server to forward network traffic from the client device to the XRDP container, and forward network traffic from the XRDP container to the client device.

At S240, user login credentials are captured, which are used for verification of a user identification with a target server. In an embodiment, the virtual workload may execute a web browser, which is predefined to access a URL directed to an access portal server. The access portal server provides the web browser with a web page which is used to capture login credentials.

At S250, the captured user login credentials are used to authenticate with a remote machine (i.e. target server). The user login credentials may be sent from the XRDP container to the frontend RDP server, which in turn validates them against the target server through a connection established by the backend server and connector. Thus, the frontend server is able to comply with the network level authentication (NLA) requirement of the RDP protocol.

At S260, a reconnect packet is injected in the communication to the client device. The reconnect packet instructs the client device to reconnect to the frontend RDP server with a new session, the new session directed to the target server, whereas the previous session was directed to the XRDP container (i.e. virtual workload). In an embodiment the reconnect packet is an instruction sent to the client device to close the current RDP connection and initiate a new connection immediately with updated information, the updated information including the target server, which replaces the XRDP container. In certain embodiments the updated information of the reconnect packet may further include an updated token which indicates to the frontend RDP server that the client device has provided login credentials which were successfully used to connect to the target server. The reconnect packet may be implemented as a RDP_SERVER_REDIRECTION_PACKET packet in RDP protocol.

At S270, an RDP session is initiated with the target server. The frontend RDP server is able to monitor the communication between the client device and the target server, as communication is passed between the target server and the client device via the frontend RDP server.

The frontend RDP server thus provides the client device with an RDP session to the target server, with the frontend RDP acting as a proxy. Providing an RDP session in this manner allows the frontend RDP server to authenticate the user of the client device (as implicated by the zero trust environment) and also allows the frontend RDP server to monitor communication between the client device and the target server, since all communication flows from the client device to the frontend RDP server, and from there to the target server via the backend server and connector. This method overcomes the restriction placed by NLA, which is that authentication is done prior to establishing a session with the target server. The frontend RDP server is able to impersonate the client device (since it has the login credentials of the client), and thus can read any data packet transferred in the communication line.

Figure 3:
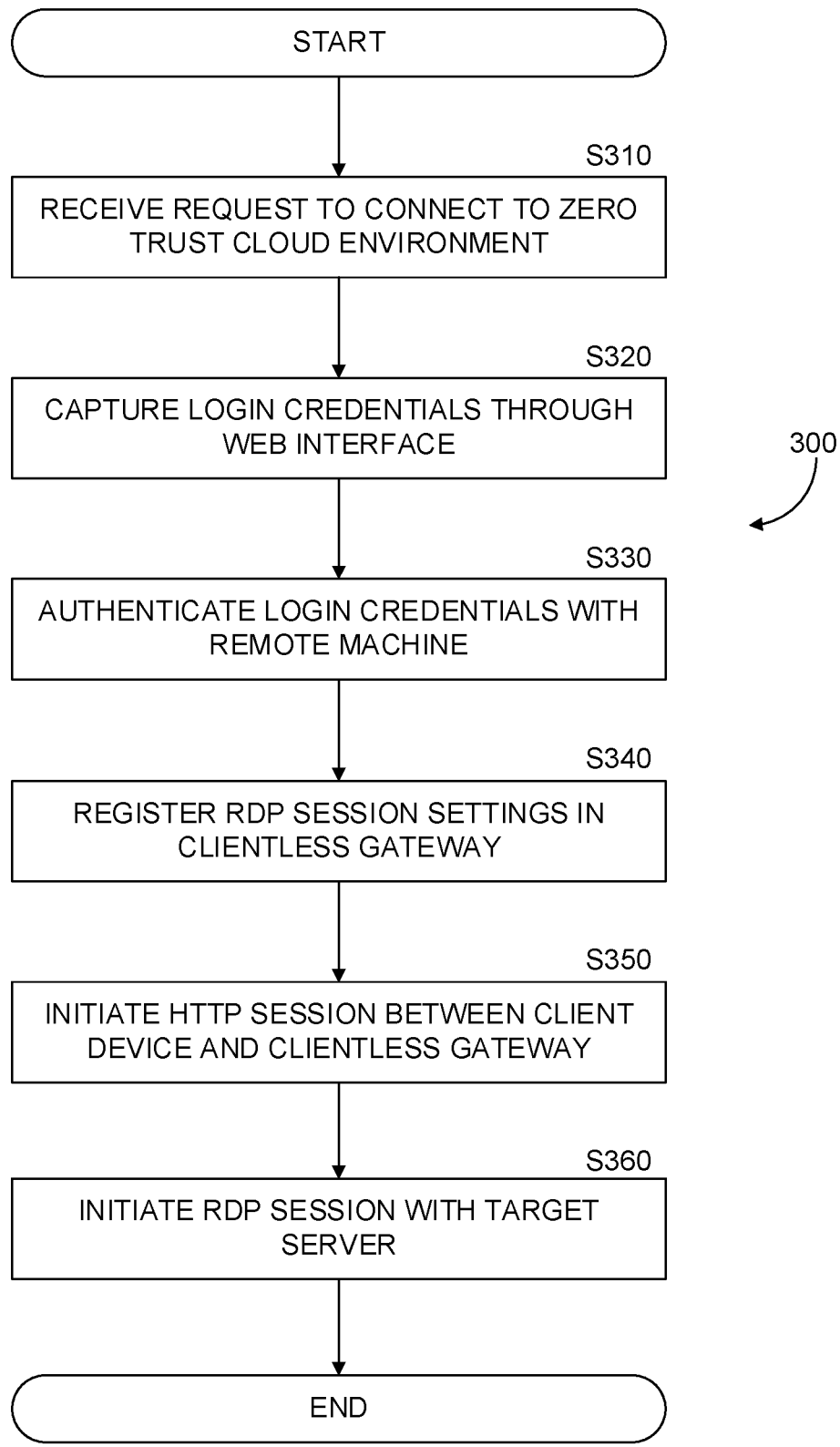
FIG. 3 is a flowchart of a method for a web based connection between a client device and a target server utilizing RDP in a zero trust environment, implemented in accordance with an embodiment.

FIG. 3 is a flowchart of a method for web based connection between a client device and a target server utilizing RDP through a zero trust environment, implemented in accordance with an embodiment.

In certain embodiments it may be advantageous to initiate the RDP session between the client device and the remote machine over HTTP, i.e. using a web browser. In such embodiments, the intermediary cloud environment (i.e. cloud environment 120) may allow a user to log in through a GUI of the intermediary cloud environment and request a connection to a remote machine. The GUI may be provided by an access portal server. For example the access portal server may provide the client device with a GUI through the web browser in which a user may provide login credentials. Authentication occurs, and the RDP session is presented in the browser. For example, Apache Guacamole may be utilized to translate between RDP and HTTP protocols. This may be implemented when a user is using a user device which does not have an RDP client installed, or when a device such as a mobile smartphone, which does not support RDP client application installation, is used to log in to a secure environment.

At S310, a request is received to connect to a zero trust cloud environment. The request may be received through an access portal server from a client device, wherein the access portal server generates instructions to render a graphical user interface (GUI) for identity verification. In an embodiment the GUI may further include, in response to successfully completing identity verification, an interface through which a user can provide a selection from one or more target machines to which to initiate an RDP session.

At S320, user login credentials are captured, which are used for verification of a user identification with a target server. The login credentials may be captured by rendering a GUI for the client device, displayed as a webpage which allows the user to fill in login credentials, such as username, password, and the like.

At S330, the captured user login credentials are used to authenticate with a remote machine (i.e. target server). The user login credentials may be sent from the access portal server to the frontend RDP server, which in turn provides them to the backend server in order to initiate an RDP session with the target server through the connector, which is implemented in the target server's computing environment.

At S340, an RDP session setting is registered in a clientless gateway. In an embodiment session settings are registered in response to receiving a selection of an RDP application in a web based GUI and providing valid login credentials. The RDP session settings are registered by the access portal server.

At S350, an HTTP connection is established between the client device and a clientless gateway. In an embodiment, the clientless gateway is implemented, for example, as Apache® Guacamole. The clientless gateway is used to translate the RDP protocol to display over HTTP (i.e., transfer RDP over HTTP), thus making it accessible in a web browser client of the client device. The clientless gateway initiates an RDP connection with the frontend RDP server, which initializes an RDP session with the target server.

At S360, an RDP session is initiated with the target server. The RDP session may be initiated by the frontend RDP server, using the captured login credentials. The client device sends data packets over HTTP to the clientless gateway (e.g. Guacamole), which translates the HTTP format to an RDP session to the frontend RDP server, which sends the data packet through the backend server and connector to the target server.

Figure 4:
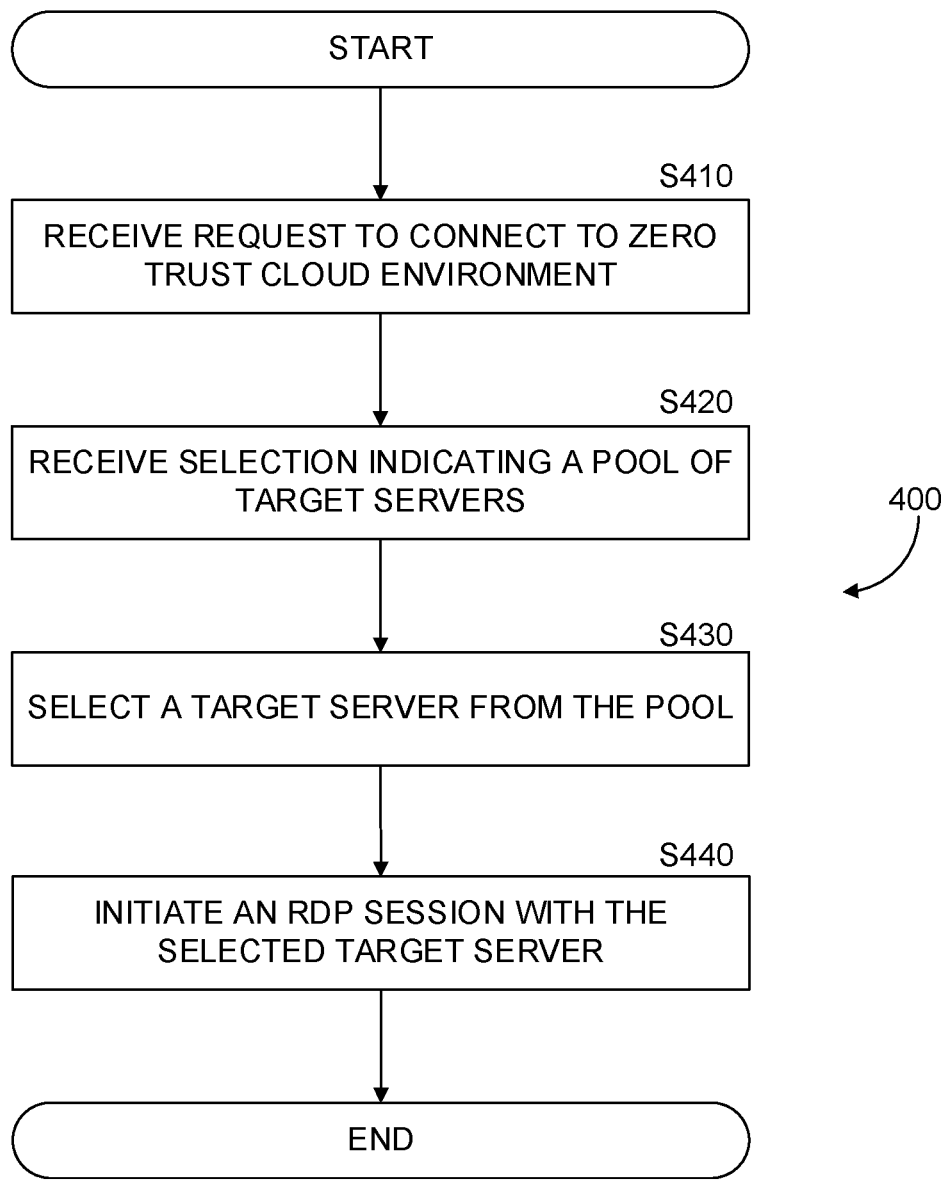
FIG. 4 is a flowchart of a method for providing a client device access to an RDP server pool, implemented in accordance with an embodiment.

FIG. 4 is a flowchart of a method for providing a client device access to an RDP server pool, implemented in accordance with an embodiment. Providing access to an RDP server pool may be advantageous for example in situations where the user is not necessarily interested in a specific machine, as much as they are interested in logging in to a particular network, or accessing an application which may be available on any one of many such machines.

At S410 a request is received to connect to a zero trust cloud environment. The request may be received through an access portal server from a client device, wherein the access portal server generates instructions to render a graphical user interface (GUI) for identity verification. In an embodiment the GUI may further include, in response to successfully completing identity verification, an interface through which a user can provide a selection from a group of target servers to which to initiate an RDP session.

At S420 a selection is received which indicates a group of target servers. In an embodiment, a GUI may represent a group of target servers, for example by rendering an icon which names a specific application executed on top of each of the target servers. By selecting the icon, for example by clicking on it, the user indicates that they wish to access the application hosted on any of the target servers. The group of target servers may also be referred to as a server pool, and in the case of RDP servers, an RDP server pool.

At S430 a target server is selected from the group of target servers. In an embodiment selection may be performed by the access portal server, the frontend RDP server, or a load balancer implemented in the zero trust cloud environment.

At S440 an RDP session is with the selected target server. The RDP session may be initiated for example utilizing the RDP client application-based method described above with respect to FIG. 2, or the web based method described above with respect to FIG. 3.

Figure 5:
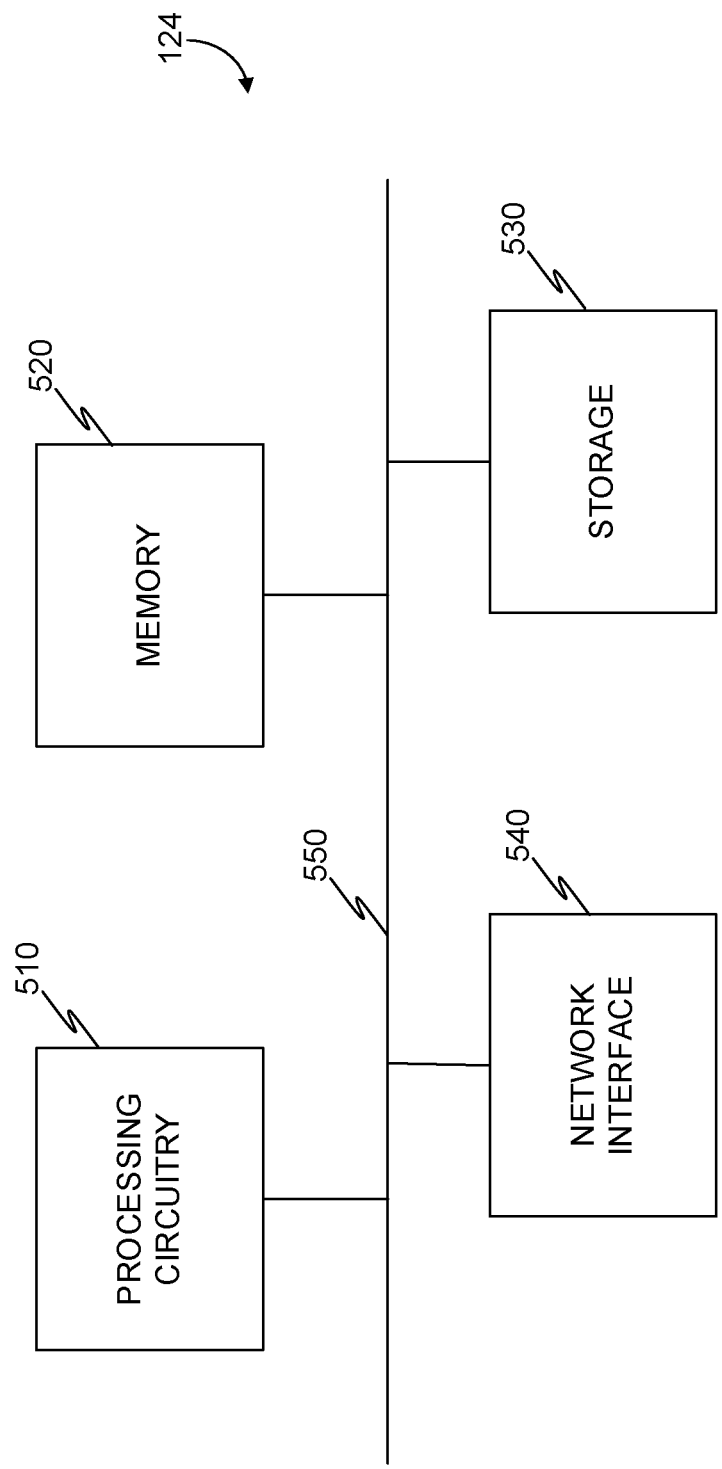
FIG. 5 is a schematic diagram of a frontend RDP server, implemented according to an embodiment.

FIG. 5 is an example schematic diagram of a frontend RDP server 124, implemented according to an embodiment. The frontend RDP server 124 includes a processing circuitry 510 coupled to a memory 520, a storage 530, and a network interface 540. In an embodiment, the components of the frontend RDP server 124 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, solid state storage, and the like, and may be realized, for example, as flash memory or other memory technology, or any other medium which can be used to store the desired information.

The network interface 540 allows the frontend RDP server 124 to communicate with, for example, client device 110, the access portal server 122, the clientless gateway 121, backend server 126, connector 123, or any combination thereof.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for connecting a client device to a target server, comprising:
   receiving, at a system comprising a hardware processor, a request from the client device to connect to a zero trust cloud environment;
   generating, by the system as a response to the request, a web based graphical user interface (GUI) to capture a login credential;
   providing, from the system, the web based GUI to the client device for rendering the web based GUI at a web client of the client device;
   authenticating, by the system, the captured login credential with the target server deployed in a secure network environment;
   based on authenticating the captured login credential, initiating, by the system, a hypertext transfer protocol (HTTP) session between the client device and a gateway in the zero trust cloud environment;
   establishing a remote desktop protocol (RDP) session between the gateway and the target server; and
   translating, at the gateway, between HTTP data packets of the HTTP session and RDP data packets of the RDP session to transfer RDP over HTTP.

2. The method of claim 1, wherein the gateway is a clientless gateway, the HTTP session is established between the client device and the clientless gateway, and the RDP session is established between the clientless gateway and the target server.

3. The method of claim 1, further comprising:
   configuring a frontend RDP server in the zero trust cloud environment to direct data received from the client device via the gateway to the target server.

4. The method of claim 1, wherein the RDP session is established between the gateway and a frontend server in the zero trust cloud environment, and the frontend server initiates an RDP session with the target server.

5. The method of claim 1, further comprising:
   terminating, by the gateway, the RDP session based on a condition being satisfied.

6. The method of claim 1, further comprising:
   terminating, by the gateway, the RDP session based on determining that a predetermined amount of time has lapsed.

7. The method of claim 1, wherein the target server comprises an RDP server.

8. The method of claim 1, wherein the system comprises an access portal server in the zero trust cloud environment, and wherein the access portal server provides the web based GUI to the client device.

9. The method of claim 1, wherein the client device is without an RDP client.

10. A non-transitory computer-readable medium comprising instructions for connecting a client device to a target server, the instructions upon execution causing a system to:
    receive a request from the client device to connect to a zero trust cloud environment;
    generate, as a response to the request, a web based graphical user interface (GUI) to capture a login credential;
    provide, from the system, the web based GUI to the client device for rendering the web based GUI at a web client of the client device;
    authenticate the captured login credential with the target server deployed in a secure network environment;

based on authenticating the captured login credential, initiate a hypertext transfer protocol (HTTP) session between the client device and a gateway in the zero trust cloud environment;
establish a remote desktop protocol (RDP) session between the gateway and the target server; and
translate, at the gateway, between HTTP data packets of the HTTP session and RDP data packets of the RDP session to transfer RDP over HTTP.

11. A system to connect a client device to a target server, the system comprising:
a processing resource; and
a non-transitory storage medium storing instructions executable by the processing resource to:
receive a request from the client device to connect to a zero trust cloud environment;
generate, as a response to the request, a web based graphical user interface (GUI) to capture a login credential;
provide, from the system, the web based GUI to the client device for rendering the web based GUI at a web client of the client device;
authenticate the captured login credential with the target server deployed in a secure network environment;
based on authenticating the captured login credential, initiate a hypertext transfer protocol (HTTP) session between the client device and a gateway in the zero trust cloud environment;
establish a remote desktop protocol (RDP) session between the gateway and the target server; and
translate, at the gateway, between HTTP data packets of the HTTP session and RDP data packets of the RDP session to transfer RDP over HTTP.

12. The system of claim 11, wherein the instructions are executable by the processing resource to:
configure a frontend RDP server in the zero trust cloud environment to direct data received from the client device via the gateway to the target server.

13. The system of claim 11, wherein the RDP session is established between the gateway and a frontend server in the zero trust cloud environment, and the frontend server initiates an RDP session with the target server.

14. The non-transitory computer-readable medium of claim 10, wherein the RDP session is established between the gateway and a frontend server in the zero trust cloud environment, and the frontend server initiates an RDP session with the target server.

15. The non-transitory computer-readable medium of claim 10, wherein the target server comprises an RDP server.

16. The non-transitory computer-readable medium of claim 15, wherein the client device is without an RDP client.

17. The system of claim 11, wherein the gateway is a clientless gateway, the HTTP session is established between the client device and the clientless gateway, and the RDP session is established between the clientless gateway and the target server.

18. The system of claim 11, wherein the instructions are executable by the processing resource to:
terminate the RDP session based on determining that a predetermined amount of time has lapsed.

19. The system of claim 11, wherein the target server comprises an RDP server.

20. The system of claim 11, wherein the client device is without an RDP client.

* * * * *